United States Patent
Vance

(10) Patent No.: US 7,561,686 B2
(45) Date of Patent: Jul. 14, 2009

(54) MOBILE TERMINAL

(75) Inventor: Scott LaDell Vance, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 687 days.

(21) Appl. No.: 10/905,382

(22) Filed: Dec. 30, 2004

(65) Prior Publication Data
US 2006/0148541 A1 Jul. 6, 2006

(51) Int. Cl.
*H04M 1/00* (2006.01)
*H04M 9/00* (2006.01)

(52) U.S. Cl. .............................. 379/433.13; 379/433.01

(58) Field of Classification Search ............ 379/433.01; 455/90.3, 351, 575.1; 361/683, 681
See application file for complete search history.

(56) References Cited

U.S. PATENT DOCUMENTS

| | | | |
|---|---|---|---|
| 6,658,272 B1 | 12/2003 | Lenchik et al. | |
| 2001/0030850 A1 | 10/2001 | Ditzik | |
| 2003/0114184 A1 | 6/2003 | Wilson | |
| 2003/0118179 A1 | 6/2003 | Barnett et al. | |
| 2004/0203507 A1 | 10/2004 | Newman et al. | |
| 2004/0212956 A1 | 10/2004 | Kuivas et al. | |

OTHER PUBLICATIONS

Sony Ericsson Mobile Communications AB, International Application No. PCT/US05/028589, Written Opinion, Dec. 13, 2005.
Sony Ericsson Mobile Communications AB, International Application No. PCT/US05/028589, International Search Report, Dec. 13, 2005.
Sony Ericsson Mobile Communications AB, International Application No. PCT/US2005/028589, International Preliminary Examination Report, Mar. 9, 2005.

*Primary Examiner*—Curtis Kuntz
*Assistant Examiner*—Phylesha Dabney
(74) *Attorney, Agent, or Firm*—Michael G. Johnston; Moore & Van Allen PLLC

(57) ABSTRACT

A mobile terminal comprises a first housing portion and a second housing portion. At least one flexible strap movably connects the first housing portion to the second housing portion at one end of each housing portion for relative movement of the housing portions along an axis parallel to the ends of the housing portions. The housing portions are movable between a first position where the inner major surface of the first housing portion is opposite the inner major surface of the second housing portion for at least partially concealing the user input means, and a second position where the outer major surface of the first housing portion is opposite the outer major surface of the second housing portion such that the user input means is exposed and accessible to the user. At least one of the housing portions encloses electronic components operable to transmit and receive telecommunication signals.

17 Claims, 9 Drawing Sheets

MOBILE TERMINAL

BACKGROUND

This invention relates generally to a mobile communication device, and more particularly to a mobile terminal used in a wireless communication system wherein the mobile terminal includes at least two body portions which are relatively rotatable through a range of up to about 360°.

A mobile terminal is used for sending and receiving information in a wireless communication system, such as a mobile telephone in a cellular telephone system. A mobile telephone typically includes a display and input mechanisms, such as keypads, buttons, and the like, which are used to control the mobile telephone. The display is used for viewing information and the input mechanisms typically provide for data entry, as well as control of any multi-media interface including the display.

With the growing popularity of the internet, mobile telephones are being used as receivers for not only voice data, but also various forms of visual data viewable on the display, such as e-mail, faxes or other forms of processed documents, pictures, videos or web pages. Mobile telephones can also function as a gaming device. Further, some mobile telephones now include a camera function for capturing images and satisfying the rising demand for video or image-based communication. Capturing images is typically accomplished by manually actuating the camera function via a shutter button or a specified sequence of key strokes.

As the various functions of a mobile telephone increase, so does the need for varying types of input mechanisms for each function. Unfortunately, users are usually restricted to one keypad layout that must suffice for multiple modes of use, such as making phone calls, gaming, messaging and image capture. Finding ways to achieve additional space savings for mobile telephones is desirable to vendors and consumers alike. As mobile telephones become smaller, less area is available for the input mechanisms. For ergonomic reasons, there is a limit below which it is undesirable to decrease the size and spacing of buttons and keys, especially keys within a keypad. One solution is to require keys to perform more than one function, as in so-called "soft keys." However, the more functions assigned to multi-function keys, the more difficult and confusing a mobile telephone becomes to use. Thus, while the compactness of the mobile telephone is advantageous for portability with regard to ordinary voice communication, this diminishment in size creates a built-in disadvantage with respect to adding features and functions to the mobile telephone. For example, size limitations lead to difficulty in viewing the display while communicating over the mobile telephone or providing user input. Enlargement of the mobile telephone is not a solution, since increased size of the mobile telephone defeats the purpose of a compact, portable communication device.

The goal of maintaining the compactness of a mobile telephone is advanced by a "flip phone", wherein the housing of the mobile telephone includes two body portions pivotally joined at one end such that one body portion serves as a "flip" cover. In this arrangement, the body portions of the housing are moveable between an open position and a closed position. In the open position, a display and keypad are visible and accessible. In the closed position, the display and keypad are substantially concealed, which can be a disadvantage in using some of the functions of the mobile telephone. Another type of mobile telephone, sometimes referred to as a "jackknife phone", has a housing including two body portions which pivot about an axis perpendicular to the longitudinal plane of the housing. This configuration allows for the display to always be on the outside of the mobile telephone. However, the mechanical and electrical connections between the body portions is complex.

For the foregoing reasons, there is a need for a mobile terminal for use in a wireless communication system which is adapted to efficiently accommodate multiple functions while maintaining compactness, portability, and functionality.

SUMMARY

According to the present invention, a mobile terminal is provided for use in a wireless communication system. The mobile terminal comprises a first housing portion having an inner major surface and an opposed outer major surface and a second housing portion having an inner major surface and an opposed outer major surface. Means are provided for user input to the mobile terminal and associated with the inner major surface of the first or the second housing portion. At least one flexible strap movably connects the first housing portion to the second housing portion at one end of each housing portion for relative movement of the housing portions along an axis parallel to the ends of the housing portions. The housing portions are movable between a first position where the inner major surface of the first housing portion is opposite the inner major surface of the second housing portion for at least partially concealing the user input means, and a second position where the outer major surface of the first housing portion is opposite the outer major surface of the second housing portion such that the user input means is exposed and accessible to the user. At least one of the housing portions encloses electronic components operable to transmit and receive telecommunication signals and the user input means is electrically connected to the electronic components in the housing.

Also according to the present invention, a method is provided for assembling a mobile terminal for use in a wireless communication system. The method comprises the steps of providing a first housing portion having an inner major surface and an opposed outer major surface and a second housing portion having an inner major surface and an opposed outer major surface. At least one of the housing portions encloses electronic components operable to transmit and receive telecommunication signals. At least one flexible strap is also provided, the flexible strap comprising an endless loop for movably connecting the first housing portion to the second housing portion. The strap is twisted once to form a first loop and a second loop and a point of intersection of the strap between the portions of the strap defining the first loop and the second loop. The first housing portion is inserted into the first loop and the second housing portion into the second loop such that the point of intersection is between one end of each of the first housing portion and the second housing portion for relative movement of the housing portions along an axis parallel to the ends of the housing portion. The housing portions are movable between a first position where the inner major surface of the first housing portion is opposite the inner major surface of the second housing portion, and a second position where the outer major surface of the first housing portion is opposite the outer major surface of the second housing portion.

BRIEF DESCRIPTION OF THE DRAWINGS

For a more complete understanding of the present invention, reference should now be had to the embodiments shown in the accompanying drawings and described below. In the drawings.

DESCRIPTION

Certain terminology is used herein for convenience only and is not to be taken as a limitation on the invention. For example, words such as "upper," "lower," "left," "right," "horizontal," "vertical," "upward," and "downward" merely describe the configuration shown in the FIGs. Indeed, the components may be oriented in any direction and the terminology, therefore, should be understood as encompassing such variations unless specified otherwise.

As used herein, the term "keypad" is used to mean any type of input device including a touch sensitive area or areas, which may include predefined key positions or a gesture area. Further, the term "keypad" is not intended to be limited to a keypad based on contacting switch technology. Rather, "keypad" as contemplated by this disclosure is intended to refer to any type of input technology that might be referred to as such, including a non-contacting type more typically referred to as a "touchpad" in which the proximity of conductive bodies is sensed.

Figure 1:
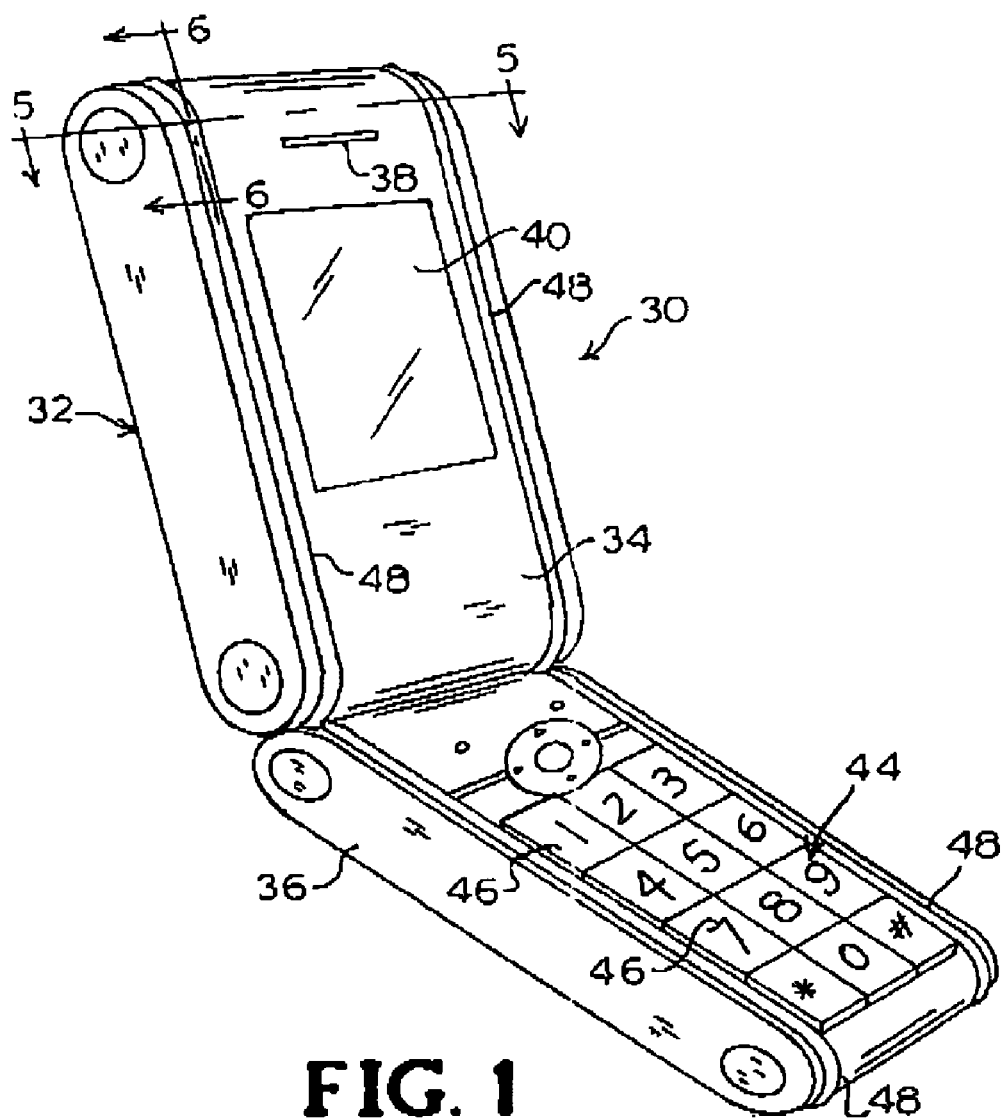
FIG. 1 is a front perspective view of an embodiment of a mobile terminal according to the present invention in an open position.

Referring now to the drawings, wherein like reference numerals designate corresponding or similar elements throughout the several views, a mobile terminal according to the present invention is shown in FIG. 1 and generally designated at 30. The mobile terminal 30 is adapted for use in a wireless communication network and, in the embodiment shown in FIG. 1, the mobile terminal 30 is a cellular telephone, which may be conventional except as otherwise provided in this description. The mobile terminal 30 comprises a housing 32 which may be of any desired size and shape; however, as described above, the trend is toward a smaller mobile terminal 30. The housing 32 contains electronic components that are operable to transmit and receive telecommunication signals, as is known in the art, and for operating other functions of the mobile terminal 30.

Figure 2:
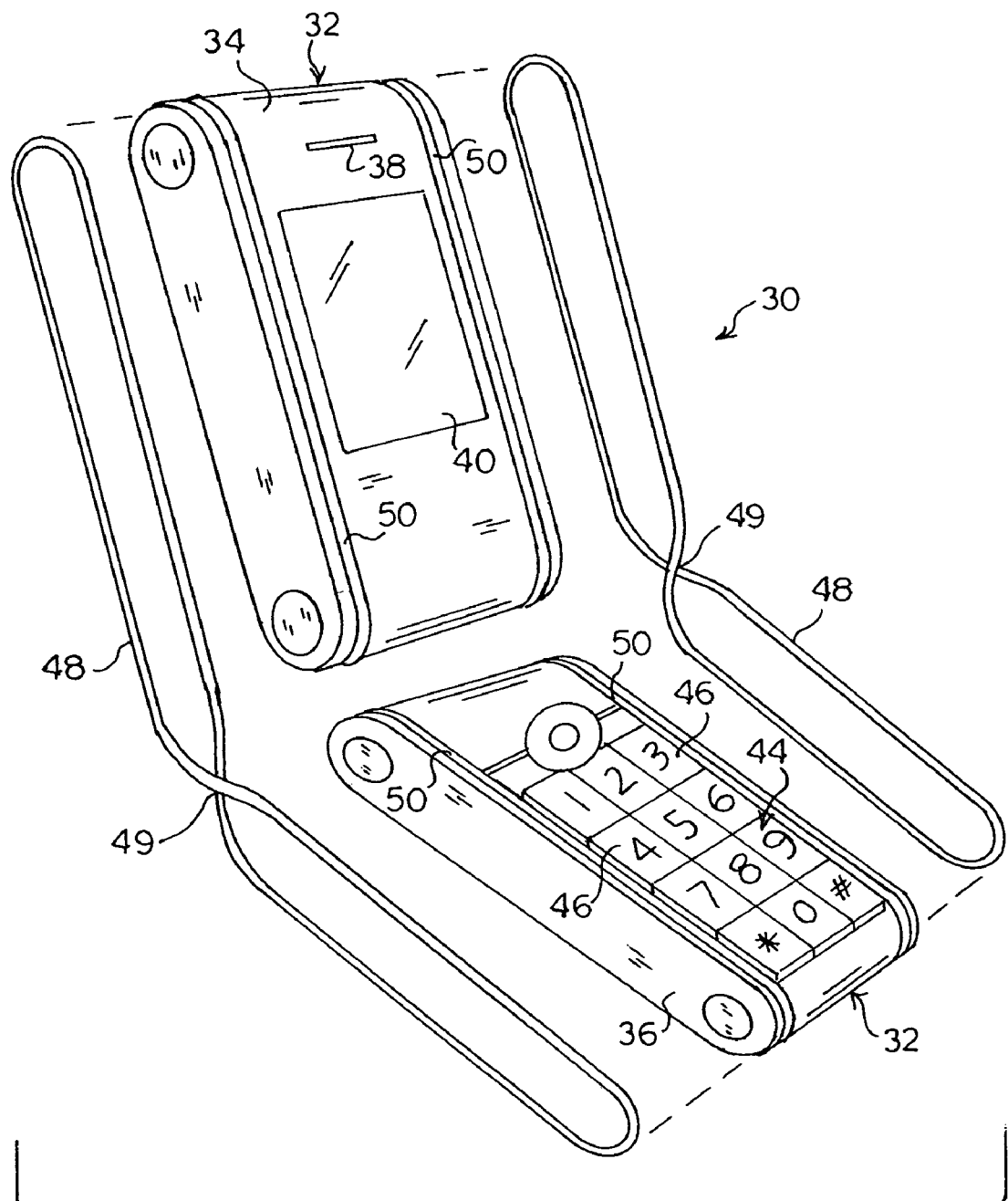
FIG. 2 is an exploded front perspective view of the mobile terminal shown in FIG. 1.

Referring to FIGS. 1 and 2, the housing 32 includes at least an upper section 34 and a lower section 36. The upper section 34 of the housing 32 includes an ear piece 38, or speaker, for emitting sound and a display 40 for displaying alphanumeric text and graphics and other images. The lower section 34 of the housing 32 includes a mouthpiece 42 for inputting sound and a keypad apparatus 44 including alphanumeric and function keys 46 that can receive tactile input. The upper section 34 and the lower section 36 of the housing 32 are electrically connected so that the user can use the keypad 44 for tactile input to enter data, make telephone calls, interact with an image on the display 40, or otherwise control operation of the mobile terminal 30. Various other controls may also be provided on the housing 32, such as special purpose keys (not shown) that control one or more functional aspects of the mobile terminal 30. For example, in a mobile terminal 30 including a camera function, one of the special purpose keys can act as a shutter release button. Because there are many types of mobile terminal housings 32 and associated components that are well known in the art and that may be utilized to practice the present invention, a more detailed description of these components is not required. It is understood that the present invention is not directed to any particular style of housing.

Figure 5:
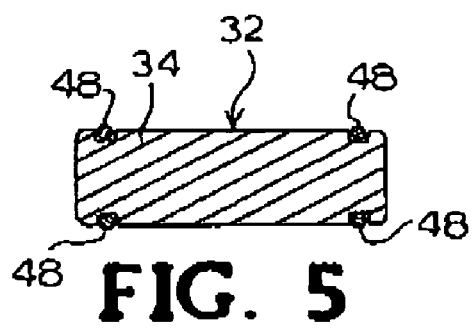
FIG. 5 is a cross-section of the mobile terminal shown in FIG. 1 taken along line 5-5.

Straps 48 are provided for movably connecting the upper section 34 and the lower section 36 of the housing 32. The connecting straps 48 are preferably formed from a strong flexible material, such as a woven nylon fabric. The nylon straps can be melted together at their ends to form an endless loop as shown in the FIGs. Preferably, the straps 48 are from about 3 mm. to about 5 mm. in diameter. The straps 48 are twisted once and fit in longitudinal grooves 50 located adjacent the edges of the housing sections 34, 36 (FIG. 5). The point of intersection 49 of each strap 48 is positioned between the ends of the housing sections 34, 36. In this position, the straps 48 do not interfere with the use of the keypad 44 or the display 40. However, it is understood that the straps 48 could be positioned anywhere appropriate for connecting the housing sections 34, 36. For example, in an alternative embodiment of the present invention, a single strap 48 may be used for movably connecting the housing sections 34, 36.

Figure 3:
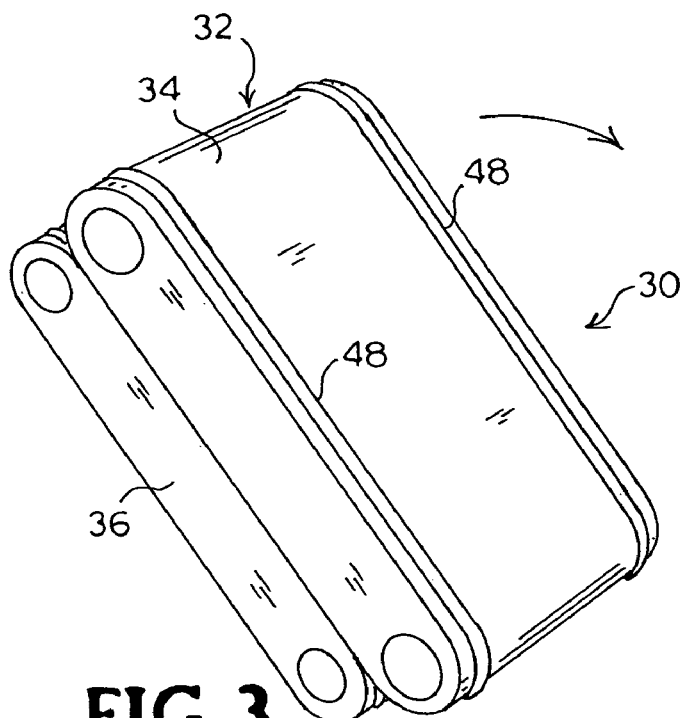
FIG. 3 is a front perspective view of the mobile terminal shown in FIG. 1 with the mobile terminal in a first folded position.

The upper section 34 and the lower section 36 of the housing 32 are joined at one end such that the upper section 34 and the lower section 36 are relatively rotatable through a range of up to about 360°. In this configuration, the housing 32 may function as a "flip phone", wherein the upper section 34 and lower section 36 of the housing 32 are moveable between an open position (FIG. 1) and a closed position (FIG. 3). In the open position, the display 40 and keypad 44 are visible and accessible to a user on the inner surfaces of the upper section 34 of the housing 32 and the lower section 36 of the housing 32, respectively. In the closed position, shown in FIG. 3, the inner surface of the upper section 34 of the housing 32 is in close and complementary registration with the inner surface of the lower section 36 of the housing 32 such that the display 40 and keypad 44 are substantially concealed. The outer surface of the upper section 34 and the outer surface of the lower section 36 of the housing 32 form the exterior surfaces of the mobile terminal 30 when in the closed position.

Figure 4:
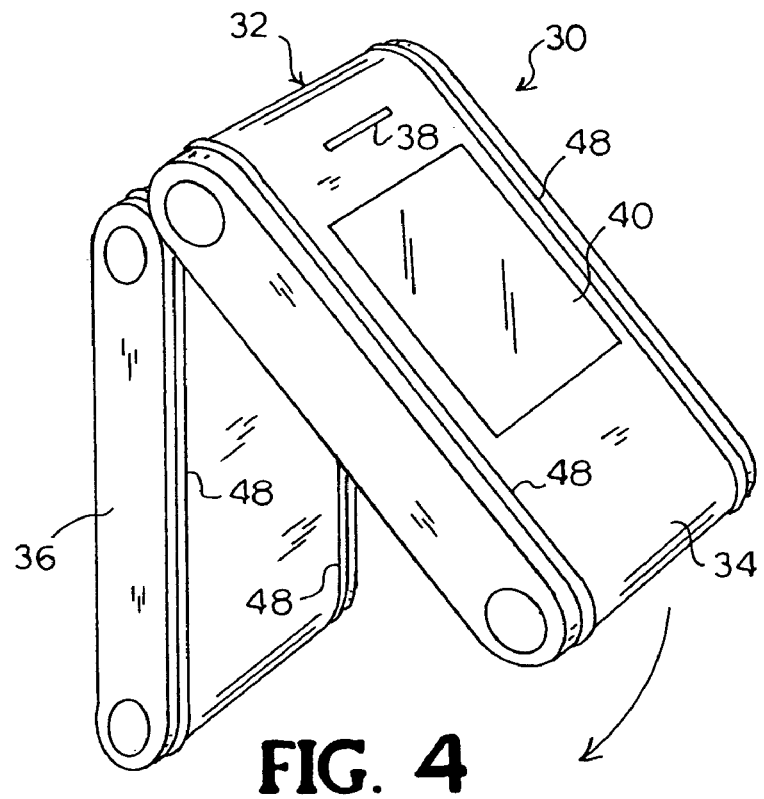
FIG. 4 is a front perspective view of the mobile terminal shown in FIG. 1 with the mobile terminal in a second folded position.

Further according to the present invention, the upper section 34 of the housing 32 and the lower section 36 of the housing 32 can be relatively rotated from the closed position in the direction shown by the arrow in FIG. 3 to a second folded position shown in FIG. 4. In the second folded position, the outer surface of the upper section 34 is in close and complementary registration with the outer surface of the lower section 36 such that the display 40 and keypad 44 (not visible in FIG. 4) are visible and accessible to a user on opposite sides of the folded mobile terminal 30. The display 40 and keypad 44 now form the exterior surfaces of the mobile terminal 30 in the position shown in FIG. 4. The point of intersection 49 of each strap 48 is also switched so that the point of intersection 49 is now between the opposite ends of the housing sections 34, 36 as compared to the closed position (FIG. 3). Moreover, the housing sections 34, 36 can be relatively rotated indefinitely in this manner to any selected position.

The straps 48 may be adapted to provide an electrical connection between the upper section 34 and the lower section 36 of the housing 32. Accordingly, at least a portion of the material of the straps 48 must be electrically conductive. In one embodiment, the straps 48 could be a woven or braided material, for example, the woven nylon fabric described above and including conductive wires, such as stainless steel threads woven into the fabric. The stainless steel threads may be gold plated to ensure good electrical contact. The straps 48 would provide transmission of DC voltage from the battery and a data signal, as well as a ground connection. A serializer may be used to transmit data. The data signal would then be transmitted as an offset voltage on either the voltage line or the ground line or both. Thus, only two connections, one line for DC voltage and the second ground line, along with a data signal line running on top of one of the two other lines, would be sufficient for electrically connecting the upper section 34 and the lower section 36 of the housing 32. Low pass/high pass filters could be used to distinguish data transmission from the DC voltage. The straps 48 may further include multiple conductors for multiple circuits.

Figure 6:
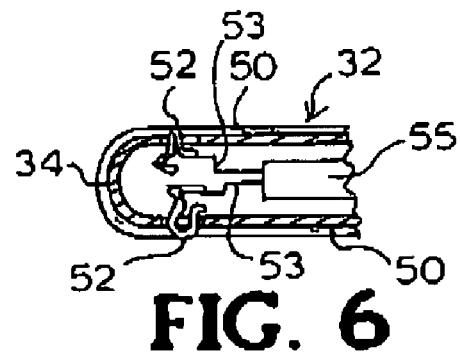
FIG. 6 is a partial cross-section of the mobile terminal shown in FIG. 1 taken along line 6-6.

Electrical contact between the straps 48 and the components within the housing 32 may be accomplished using a spring contact 52, as shown in FIG. 6. FIG. 6 is a cross-section of one end of the upper section 34 of the housing 32 taken along the longitudinal groove 50 with the strap 48 removed. The spring contact 52 is disposed in the housing 32 such that an outer portion of the spring contact 52 is biased outwardly of an opening 54 in the housing 32 adjacent one end of the groove 50. Because the woven straps 48 would have a plurality of exposed eclectically conductive threads, when the straps 48 are in the grooves 50 the straps 48 are electrically connected through the contacts 52 to the components in the housing 32 and able transmit voltage and data between the housing sections 34, 36.

It is understood that separate batteries could be provided within each housing section. However, it is preferred that the sections of the housing 32 are electrically connected so that the mobile terminal 30 may operate off a single power supply. Additionally, signals may be transmitted between housing sections 34, 36 via a Bluetooth or WLAN component in each section of the housing 32. The antennas for the respective upper and lower housing sections 34, 36 would preferably be located proximate to each other to allow for near-field coupling.

Figure 7:
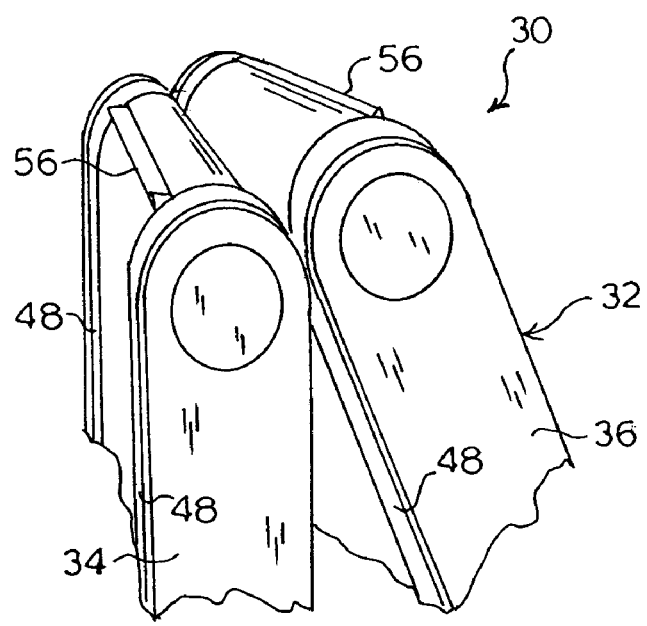
FIG. 7 is a close-up side elevation view of the mobile terminal shown in FIG. 1 between the open and a folded position.
Figure 8:
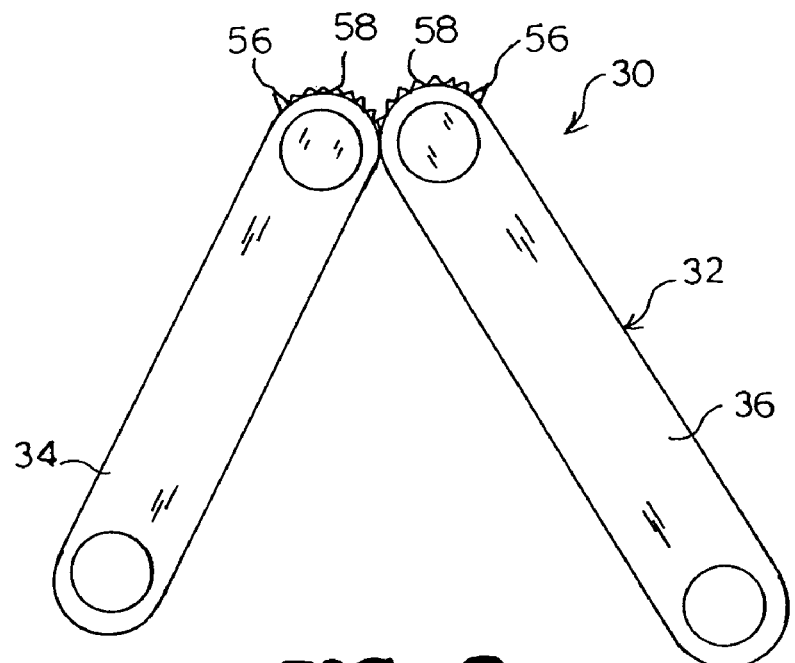
FIG. 8 is a side elevation view of the mobile terminal shown in FIG. 1 between the open position and a folded position.

Referring to FIG. 7, the upper housing section 34 and the lower housing section 36 are shown at a position of relative rotation. To allow relative rotation of the upper and lower housing sections 34, 36 without slipping, the ends of the housing sections 34, 36 may comprise a non-slip material, such as rubber or another elastomeric material. The ends of the housing sections 34, 36 may also include transverse ridges 56 which function to stop relative rotation of the housing sections 34, 36 in a predetermined position, such as the open position of a typical mobile telephone. However, because the straps 48 are flexible, the impediment created by the transverse ridges 56 can be overcome to continue relative rotation of the housing sections 34, 36 to a selected position. Alternatively, gear teeth 58 (FIG. 8) may be provided on the adjacent ends of the housing sections 34, 36 to prevent slipping, and may include transverse ridges 56, as shown, to provide a hard stop.

The housing sections 34, 36 could also snap into position, as is know in the art, in several different positions including, for example, the talking position, the closed position, a completely open position, and a desktop position in which the mobile terminal 30 is used as a speakerphone.

Figure 9:
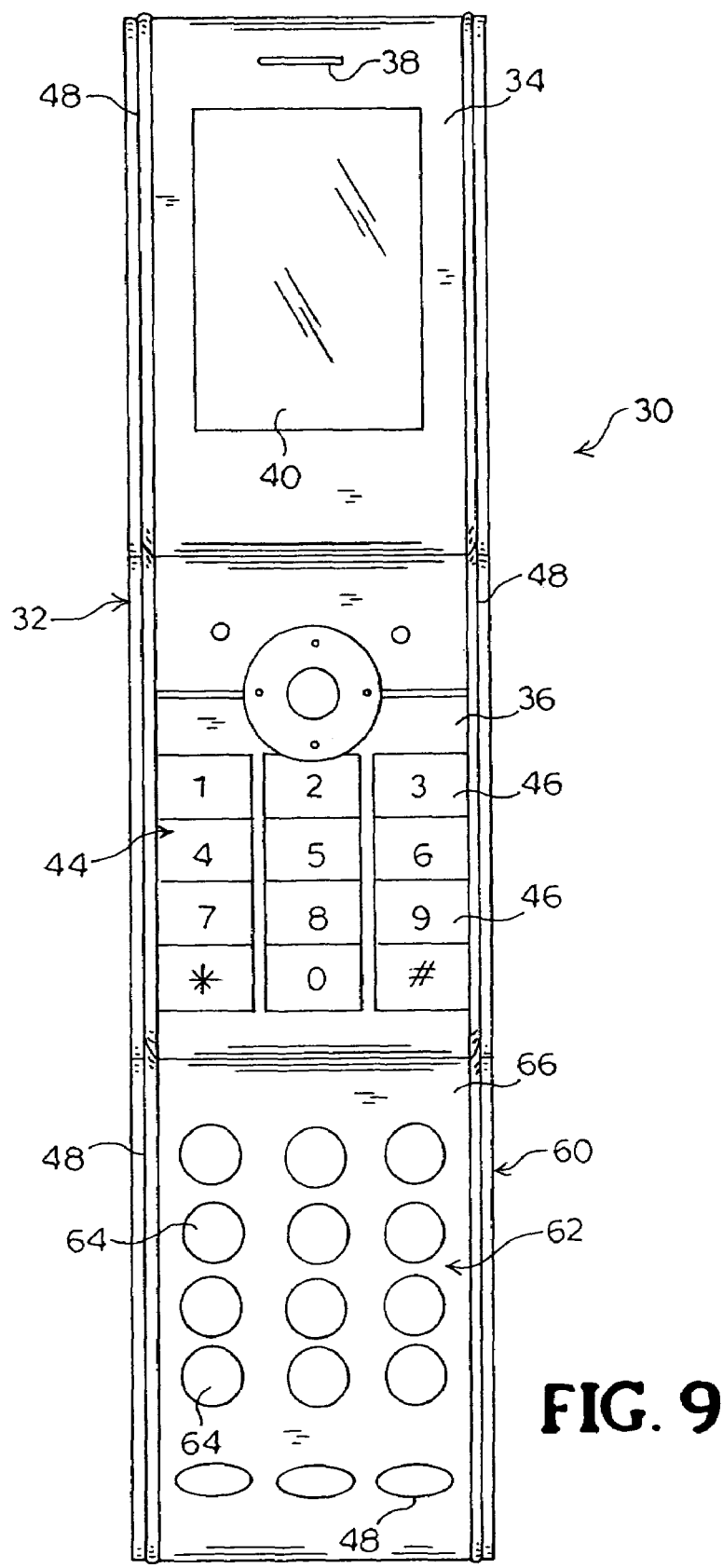
FIG. 9 is a top plan view of another embodiment of a mobile terminal according to the present invention in an open position.
Figure 10:
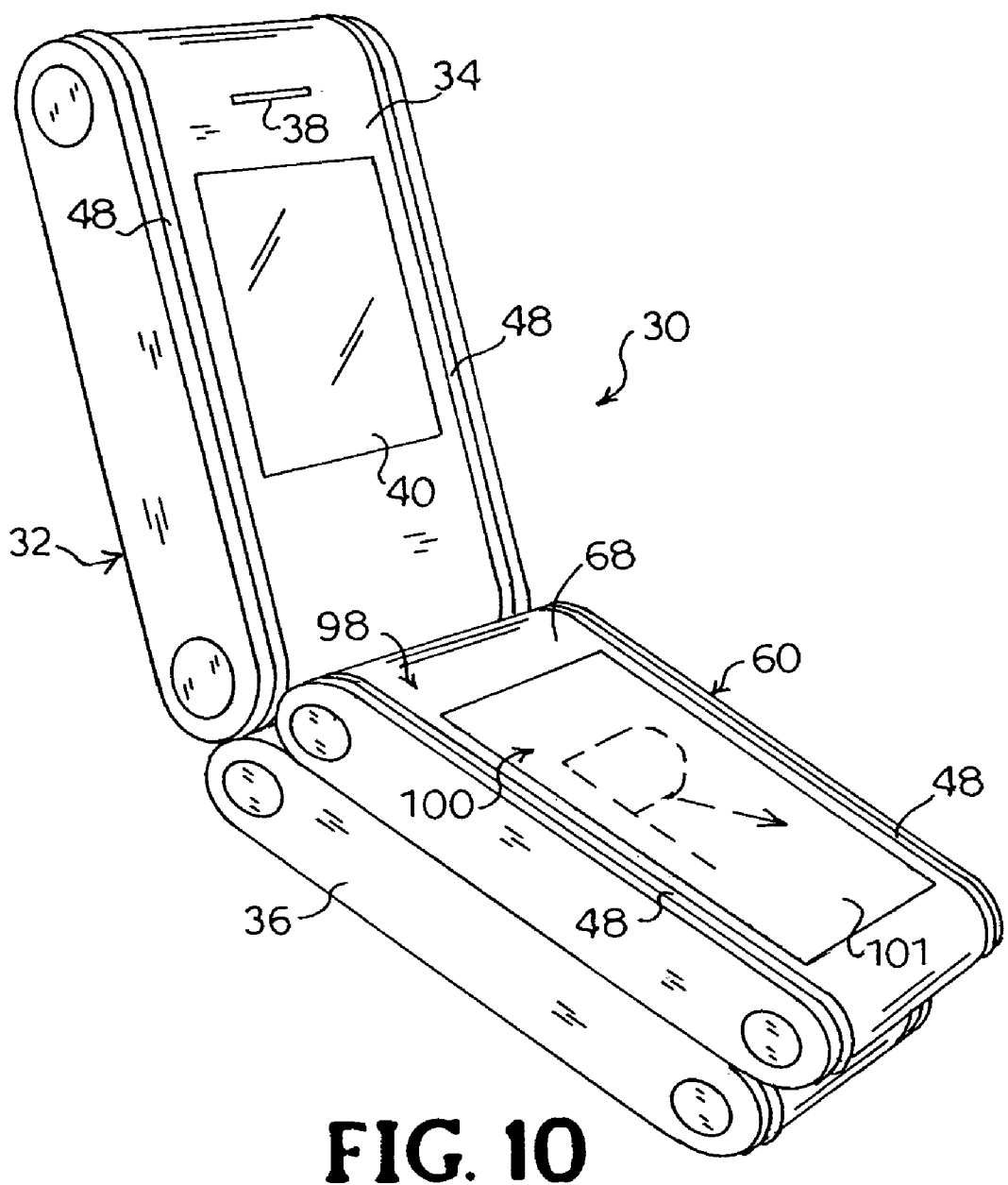
FIG. 10 is a front perspective view of the mobile terminal shown in FIG. 9 in a first folded position.

According to the present invention, one or more additional housing sections may be selectively added to the mobile terminal 30. As shown in FIGS. 9 and 10, an additional housing section, designated generally at 60, may include on an inner surface 66 a keypad 62 with standard alphanumeric and function input keys 64. As noted above, any type of keypad technology could be used to implement this aspect of the present invention. In the case of contacting keypad technology, actual "buttons", as shown at 64, protrude from the housing section 60. In the case of a non-contacting touchpad, buttons are silk-screened or otherwise printed on the tactile surfaces and, as such, the protrusions would not be visible.

The additional housing section 60 is movably coupled to the lower housing section 36 using the straps 48, as described above. The straps 48 are twisted twice and fit in the longitudinal grooves 50 located adjacent the edges of the housing sections 34, 36, 60 such that the two points of intersection (not visible in the FIGs.) of each strap 48 are between the housing sections 34, 36, 60. The additional housing section 60 is electrically connected to the appropriate electronic components in the housing 32 so that tactile input can be received from the keypad 62. The connecting straps 48 may be used for effecting the electrical connection in the manner described above.

The housing sections 34, 36, 60 are joined such that they are relatively rotatable through a range of up to about 360° with respect to the adjacent housing section. However, with three or more housing sections possible in one mobile terminal 30 according to the present invention, the relationship among the housing sections limits relative rotation of two housing sections to at least about 150°. For example, rotational movement of the additional housing section 60 relative to the lower housing section 36 may be between a first open position, shown in FIG. 9, and a second position, shown in FIG. 10. The second position of the additional housing section 60 is reached after pivoting the additional housing section 60 about the lower housing section 36 until the inner surface 66 or the additional housing section 60 is against the inner surface of the lower section 36 of the housing 22.

When the mobile terminal 30 is in the open position (FIG. 9), the inner surface 66 of the additional housing section 60 is accessible from or substantially coincident with the inner surface of the lower housing section 36, and an outer surface 68 of the additional housing section 60 is accessible from or substantially coincident with the outer surface of the lower housing section 36. In the open position, the keypad 62 on the inner surface 64 of the additional housing section 60 and the keypad 34 on the inner surface of the lower section 34 of the housing 32 are both revealed and accessible. Adding the additional housing section 60 comprising the keypad 62 to the mobile terminal 30, which already has a keypad 44 associated with the lower section 36 of the housing 32, can effectively double the area for input keys. The new additional keypad 62 may represent a different keypad layout that may be optimized for a particular function, such as making phone calls, gaming or messaging. For example, in one embodiment, the keypad 62 on the additional housing section 60 may be the left side of a keyboard, like the left side of the English Qwerty version. Thus, holding the mobile terminal 30 sideways will allow the user to use both hands to access the full keyboard in connection with, for example, the transmission of information, such as is the case when the user is using the mobile terminal 30 to compose or transmit a document or some other information. The user could also be able to use both keypads 44, 62 to navigate through the displayed information, as well as to select or manipulate all, or portions of, the image on the display 40, and the like.

In the second position, the inner surface 66 of the additional housing section 60 is in close and complementary registration with the inner surface of the lower housing section 36 such that both keypads 44, 62 are substantially concealed and a tactile area 98 on the outer surface 68 of the additional housing section 60 is revealed and accessible. The tactile area 98 includes a "gesture area" 100, including a display 101 and a keypad 102 with input keys 104. The dotted arrowed line shown in the gesture area 100 illustrates the recent gesture. For purposes of this description, the gesture area 100 has been used to enter the letter "R" to search for the name "Roger Smith" which is currently displayed on the display. If a touch screen is used in the gesture area 100, the mobile terminal 30 would have the functionality of a clamshell phone in the open position and a Palm Pilot in the closed position where the gesture area 100 is revealed.

In order to operate the mobile terminal 30 with only one side of the additional housing section 60 enabled, as described above, it is understood it may be necessary to determine the position of the housing sections 34, 36, 60 during operation and selectively enable either the inside keypad 62 or the outside tactile area 98. Thus, input may be selectively received from input means on only one side of the additional housing section 60, depending on the position of the housing section 60. For example, this means that only the keypad 62 on the inner surface 66 of the additional housing section 60 would be enabled at any particular time and that the tactile area 98 on the outer surface 68 would be disabled. A mechanism or means may be provided within the mobile terminal 30 for determining the position of the housing sections 34, 36, 60. For example, a switch, relay or contact (not shown) could be operatively associated with the housing 32, as is known in the art. When the additional housing section 60 is moved, delivery of the user input signal would be automatically switched from one surface to the other surface 66, 68. A sensor could also be used to enable the determination of the relative positions of the housing sections, eliminating the need for the separate switch. Pulsed Hall sensors and magnets are commonly used for this purpose in similar applications due to the low current draw and low cost. Because one input means may be effectively disabled when the housing 32 is in a particular position, since the respective input may be concealed and inaccessible, this arrangement would reduce power consumption and prevent false key presses caused by handling the mobile terminal 30. In any case, electrical and programmatic functions that are necessary to enable full use of the additional housing section 60, as described, are implemented through the processor, control logic, and any drivers which are installed within the mobile terminal 30. These components, along with any microcode or other software form the means to receive input through the additional housing section 60.

Further additional housing sections (not shown) can be added to, or interchanged with, the additional housing section 60 shown in FIGS. 9 and 10. Each additional or new housing section may have a different keypad layout optimized for a particular function, such as making phone calls, gaming or messaging. For example, an additional housing section may comprise a double-sided keypad that may selectively receive tactile input from one or both sides of the keypad. By input being received from one or both sides of the keypad selectively, what is meant is that only one side of the keypad is enabled or disabled at any particular time based on the position of the housing section. Another embodiment may include a double-sided keypad in which both sides are enabled at all times, thus effectively providing for receiving input from both the first side and the second side of the keypad apparatus in a non-selective fashion. In either embodiment, in the second position of the mobile terminal 30 (FIG. 10), a keypad on the outer surface of the additional housing section is revealed and accessible together with the display 40. When employed in a mobile terminal which otherwise has a keypad associated with the housing, the additional housing section comprising two keypads can effectively triple the area for input keys. Thus, the result is a plurality of different keypad layouts in one mobile terminal 30. The user can then select the preferred keypad layout and position any number of housing sections by rotating the housing sections relative to the one another for exposing the preferred keypad and concealing the other keypad. Thus, the present invention makes it possible to easily switch between the keypads depending on which is best suited for the situation and, therefore, increase the utility of the mobile terminal 30.

A second folded position (not shown) of the additional housing section 60 is reached by relative rotation of the additional housing section 60 in a direction opposite to the direction to reach the first folded position. The result is that the outer surface 68 of the additional housing section 60 is in close and complementary registration with the outer surface of the lower section 36 of the housing 32 such that the keypad 62 on the additional housing section 60 is now on the opposite side of the display 40 and keypad 44 on the lower housing section 36. It is understood that the second folded position of the mobile terminal 30 may have a practical use depending on the functionality of the additional housing section 60.

Figure 11:
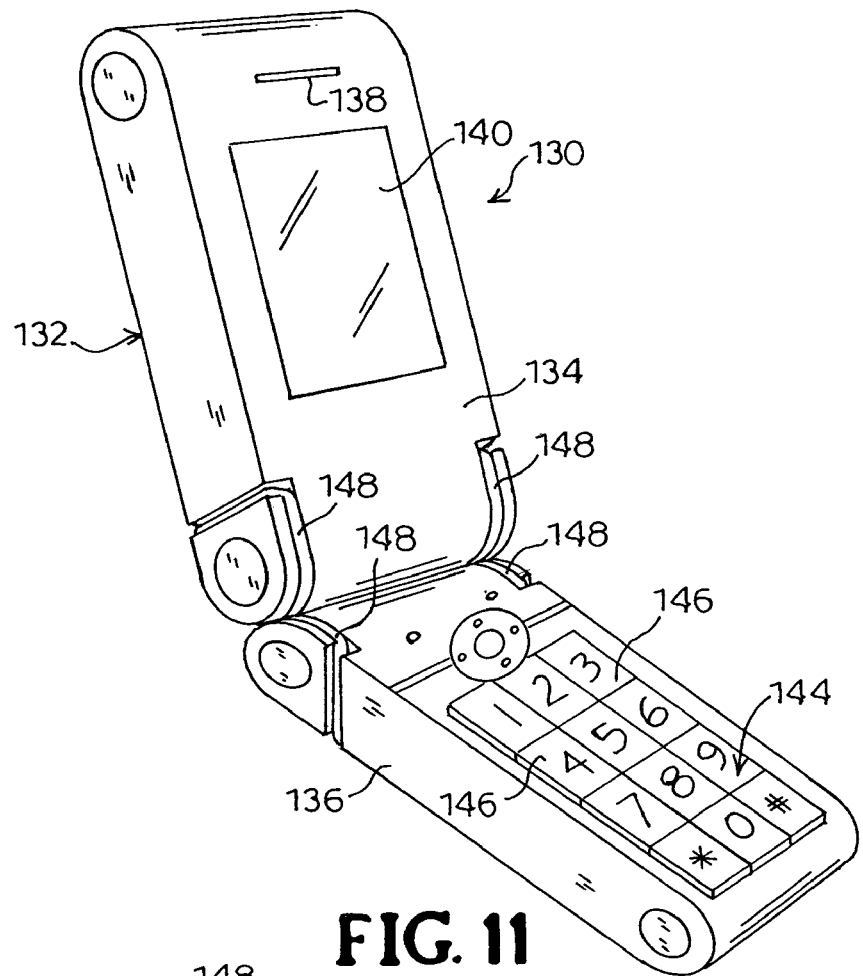
FIG. 11 is a front perspective view of a third embodiment of a mobile terminal according to the present invention in an open position.

Another embodiment of a mobile terminal according to the present invention is shown in FIG. 11 and generally designated at 130. As in the previous embodiment, the mobile terminal 130 comprises a housing 132 containing electronic components that are operable to transmit and receive telecommunication signals, as is known in the art, and for operating other functions of the mobile terminal 130. The housing 132 includes an upper section 134 and a lower section 136. The upper section 134 of the housing 132 includes an ear piece 138 and a display 140. The lower section 134 of the housing 132 includes a mouthpiece 142 for inputting sound and a keypad apparatus 144 including alphanumeric and function keys 146 that can receive tactile input. The upper section 134 and the lower section 136 of the housing 132 are electrically connected so that the user can use the keypad 144 for tactile input to enter data, make telephone calls, interact with an image on the display 140, or otherwise control operation of the mobile terminal 130.

Figure 12:
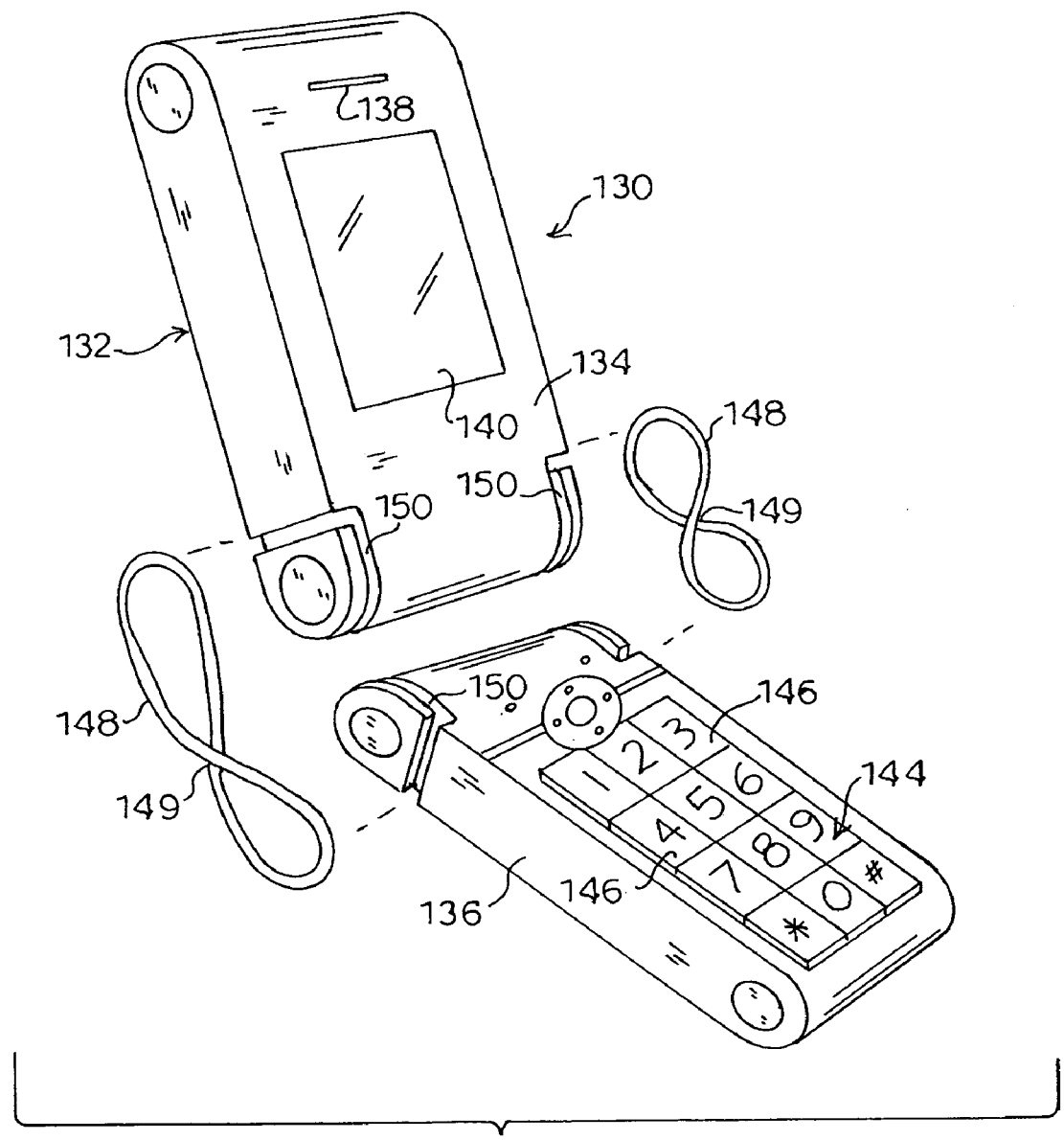
FIG. 12 is an exploded front perspective view of the mobile terminal shown in FIG. 11.

Straps 148 forming an endless loop are also provided for movably connecting the upper section 134 of the housing 132 and the lower section 136 of the housing 132. As in the previous embodiment described above, the connecting straps 148 are preferably formed from a strong flexible material, such as a woven nylon fabric which can be melted together at its ends to form the endless loop. The straps 148 are twisted once and fit in semicircular slots 150 formed in the lower portion of the edges of the housing sections 134, 136 (FIG. 12). The point of intersection 149 of each strap 148 is between the housing sections 134, 136 when assembled. As described above, the straps 148, along with spring contacts (not shown) disposed in the housing, may be further adapted to provide an electrical connection between the upper section 134 and the lower section 136 of the housing 132.

The straps 148 join the upper section 134 of the housing 132 and the lower section 136 of the housing 132 at one end such that the upper section 134 and the lower section 136 are relatively rotatable through a range of up to about 180°. In this configuration, the housing 132 may function as a "flip phone", wherein the upper section 134 and lower section 136 of the housing 132 are moveable between an open position (FIG. 11) and a first folded, or closed position, which is the same as shown in FIG. 3 in the previous embodiment. In the open position, the display 140 and keypad 144 are visible and accessible to a user on the inner surfaces of the upper section 134 of the housing 132 and the lower section 136 of the housing 132, respectively. In the closed position, the inner surface of the upper section 134 is in close and complementary registration with the inner surface of the lower section 136 such that the display 140 and keypad 144 are substantially concealed. The outer surface of the upper section 134 and the outer surface of the lower section 136 of the housing 132 form the exterior surfaces of the mobile terminal 130 when in the closed position.

Figure 13:
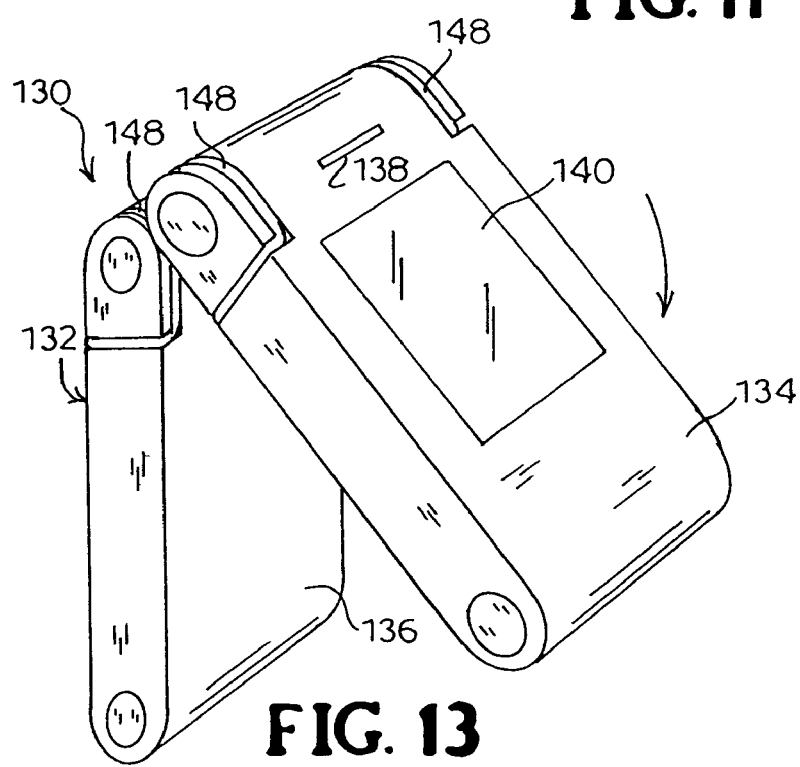
FIG. 13 is a rear perspective view of the mobile terminal shown in FIG. 11 with the mobile terminal between the open position and a closed position.

Further according to this embodiment of the present invention, the upper section 134 of the housing 132 and the lower section 136 of the housing 132 can be relatively rotated in the direction shown by the arrow in FIG. 13 toward a second folded position, which is the same as shown in FIG. 4 in the previous embodiment. In this position, the outer surface of the upper section 134 is in close and complementary registration with the outer surface of the lower section 136 such that the display 140 and keypad 144 are visible and accessible to a user on opposite sides of the folded mobile terminal 130. The display 140 and keypad 144 form the exterior surfaces of the mobile terminal 130 in the second folded position.

The ends of the housing sections 34, 36 may also include transverse ridges 56 which function to stop relative rotation of the housing sections 34, 36 in a predetermined position, such as the open position of a typical mobile telephone. However, because the straps 48 are flexible, the impediment created by the transverse ridges 56 can be overcome to continue rotation of the housing sections 34, 36. Alternatively, gear teeth 58 (FIG. 8) may be provided on the adjacent ends of the housing sections 34, 36 to prevent slipping, and may include transverse ridges 56 as shown to provide a hard stop.

In keeping with the present invention, it is understood that additional housing sections, or modules, could be incrementally added to, or selectively interchanged with, any of the other housing sections comprising the mobile terminal 30. The only common component would be the straps 48 for joining the housing sections. The additional or new housing sections, or modules, become an integral part of the mobile terminal 30, adding or replacing functionality such as for gaming, additional batteries, GRS modules, etc. Replacement of a faulty housing section is also possible and would minimize repair costs. It should also be noted that any housing section may have other positions allowed by the flexible straps 48 in addition to those shown in the FIGs.

While the present invention is described herein in the context of a mobile terminal in the form of a mobile cellular telephone, it should be understood that the mobile terminal of the present invention is not so limited and may find utility in other electronics devices and applications. For example, the term "mobile telephone" as used herein may include a cellular radiotelephone with or without a multi-line display; landline and cordless telephones; a Personal Communications System (PCS) terminal that may combine a cellular telephone with data processing, facsimile and data communications capabilities; internet/intranet access devices; organizers; a Personal Digital Assistant (PDA) that can include a radiotelephone, pager, internet/intranet access, Web browser, organizer, calendar and/or a global positioning system (GPS) receiver; wristwatch keypad devices; and a conventional laptop and/or palmtop receiver or other computer system that includes a display. Mobile telephones may also be referred to as "pervasive computing" devices. In one embodiment of the present invention, the invention may be implemented on a computer system having a memory circuit for storage of data, a display which acts to generate images, and a control circuit that is configured to control the flow of data between the memory and receiver.

Although the present invention has been shown and described in considerable detail with respect to only a few exemplary embodiments thereof, it should be understood by those skilled in the art that I do not intend to limit the invention to the embodiments since various modifications, omissions and additions may be made to the disclosed embodiments without materially departing from the novel teachings and advantages of the invention, particularly in light of the foregoing teachings. For example, the present invention is suitable for use in a number of portable and non-portable electronics devices and applications. Accordingly, we intend to cover all such modifications, omission, additions and equivalents as may be included within the spirit and scope of the invention as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A mobile terminal for use in a wireless communication system, the mobile terminal comprising:

a first housing portion having a first end and a second end, and an inner major surface and an opposed outer major surface;

a second housing portion having a first end and a second end, and an inner major surface and an opposed outer major surface;

means for providing user input to the mobile terminal, the user input means associated with the inner major surface of the first or the second housing portion; and at least one flexible strap for movably connecting the first housing portion to the second housing portion at one end of each housing portion for relative movement of the housing portions along an axis parallel to the ends of the housing portions, wherein each of the first housing portion and the second housing portion has a longitudinal axis and defines a groove for receiving the strap, the grooves substantially parallel to the longitudinal axis and extending the length of the inner and outer major surface of the housing portions, the housing portions movable from a first position where the inner major surface of the first housing portion is opposite the inner major surface of the second housing portion and the first end of the first housing portion is adjacent the second end of the second housing portion and the second end of the first housing portion is adjacent the first end of the second housing portion for at least partially concealing the user input means, and a second position where the outer major surface of the first housing portion is opposite the outer major surface of the second housing portion and the first end of the first housing portion is adjacent the second end of the second housing portion and the second end of the first housing portion is adjacent the first end of the second housing portion such that the user input means is exposed and accessible to the user, wherein the axis for relative movement of the housing portions from the second position to the first position is selectively between either the second end of the first housing portion and the first end of the second housing portion or the first end of the first housing portion and the second end of the second housing portion, and wherein at least one of the housing portions encloses electronic components operable to transmit and receive telecommunication signals and the user input means is electrically connected to the electronic components in the housing.

2. A mobile terminal as recited in claim 1, wherein the user input means comprises a keypad apparatus disposed within the housing portion, the keypad apparatus electrically connected to the electronic components in the housing so that tactile input can be received.

3. A mobile terminal as recited in claim 1, further comprising a display associated with the inner major surface of at least one of the housing portions and electrically connected to the electronic components in the housing such that the display is at least partially concealed in the first position and is visible and accessible to the user in the second position.

4. A mobile terminal as recited in claim 1, wherein the mobile terminal is a cellular telephone.

5. A mobile terminal as recited in claim 1, further comprising a third housing portion having an inner major surface and an opposed outer major surface, the strap movably connecting the third housing portion to the second housing portion at one end of each housing portion for relative movement of the housing portions along an axis parallel to the ends of the housing portions from a first position where the inner major surface of the third housing portion is opposite the inner major surface of the second housing portion, and a second position where the outer major surface of the third housing portion is opposite the outer major surface of the second housing portion.

6. A mobile terminal as recited in claim 5, wherein the third housing portion comprises a keypad apparatus electrically connected to the electronic components in the housing so that tactile input can be received.

7. A mobile terminal as recited in claim 6, wherein the keypad apparatus is a non-contacting keypad.

8. A mobile terminal as recited in claim 6, wherein the keypad apparatus comprises a single key pad associated wit a major surface of the third housing portion.

9. A mobile terminal as recited in claim 6, wherein the keypad apparatus has a first side and a second side, the keypad apparatus disposed within the third housing portion so that the first side is substantially coincident with the inner major surface of the flip cover and the second side is substantially coincident with the outer major surface of the third housing portion, wherein tactile input can be received at least selectively from either or both of the first side or the second side of the keypad apparatus.

10. A mobile terminal as recited in claim 6, wherein at least one side of the keypad apparatus comprises a gesture area.

11. A mobile terminal as recited in claim 1, wherein the groove is adjacent the edge of the housing portions.

12. A mobile terminal as recited in claim 1, wherein the strap comprises electrically conductive material, and further comprising means for electrically connecting the strap to the electronic components in the housing.

13. A mobile terminal as recited in claim 12, wherein the each of the first housing portion and the second housing portion defines an opening into the interior of the housing, and wherein the electrically connecting means comprises a spring contact disposed in the openings in the housing portions, the spring contacts connected at one end to the electronic components in the housing and at the other end to the strap.

14. A mobile terminal as recited in claim 12, wherein the each of the first housing portion and the second housing portion defines a groove for receiving the strap, and wherein the openings in the housing portions open into the groove.

15. A method of assembling a mobile terminal for use in a wireless communication system, the method comprising:

providing a first housing portion having a first end and a second end, and an inner major surface and an opposed outer major surface;

providing a second housing portion having a first end and a second end, and an inner major surface and an opposed outer major surface, wherein at least one of the housing portions encloses electronic components operable to transmit and receive telecommunication signals;

providing at least one flexible strap comprising an endless loop for movably connecting the first housing portion to the second housing portion, wherein each of the first housing portion and the second housing portion has a longitudinal axis and defines a groove for receiving the strap, the grooves substantially parallel to the longitudinal axis and extending the length of the inner and outer major surface of the housing portions;

twisting the strap once to form a first loop end a second loop and a point of intersection of the strap between the portions of the strap defining the first loop and the second loop; and inserting the first loop into the groove of the first housing portion and the second loop into the groove of the second housing portion such that the point of intersection is between one end of each of the first housing portion and the second housing portion for relative movement of the housing portions along an axis parallel to the ends of the housing portion from a first position where the inner major surface of the first housing portion is opposite the inner major surface of the second housing portion and the first end of the first housing portion is adjacent the second end of the second housing portion and the second end of the first housing portion is adjacent the first end of the second housing portion, and a second position where the outer major surface of the first housing portion is opposite the outer major surface of the second housing portion and the first end of the first housing portion is adjacent the second end of the second housing portion and the second end of the first housing portion is adjacent the first end of the second housing portion, wherein the axis for relative movement of the housing portions from the second position to the first position is selectively between either the second end of the first housing portion and the first end of the second housing portion or the first end of the first housing portion and the second end of the second housing portion.

16. A method of assembling a mobile terminal as recited in claim 15, further comprising the steps of
    providing a third housing portion having an inner major surface and an opposed outer major surface;
    twisting the strap a second time to form a third loop and a second point of intersection of the strap between the portions of the strap defining the second loop and the third loop; and
    inserting the third housing portion into the third loop such that the second point of intersection is between one end of each of the second housing portion and the third housing portion for relative movement of the housing portions along an axis parallel to the ends of the housing portion from a first position where the inner major surface of the third housing portion is opposite the inner major surface of the second housing portion, and a second position where the outer major surface of the third housing portion is opposite the outer major surface of the second housing portion.

17. A method of assembling a mobile terminal as recited in claim 15, further comprising the steps of
    providing a third housing portion having an inner major surface and an opposed outer major surface;
    expanding either the first loop or the second loop of the strap;
    removing the first or the second housing portion form the expanded loop of the strap;
    inserting the third housing portion into the second loop such that the point of intersection is between one end of the remaining housing portion and the third housing portion for relative movement of the housing portions along an axis parallel to the ends of the housing portions from a first position where the inner major surface of the third housing portion is opposite the inner major surface of the remaining housing portion, and a second position where the outer major surface of the third housing portion is opposite the outer major surface of the remaining housing portion.

* * * * *

UNITED STATES PATENT AND TRADEMARK OFFICE
CERTIFICATE OF CORRECTION

| | |
|---|---|
| PATENT NO. | : 7,561,686 B2 |
| APPLICATION NO. | : 10/905382 |
| DATED | : July 14, 2009 |
| INVENTOR(S) | : Scott LaDell Vance |

Figure 9A:
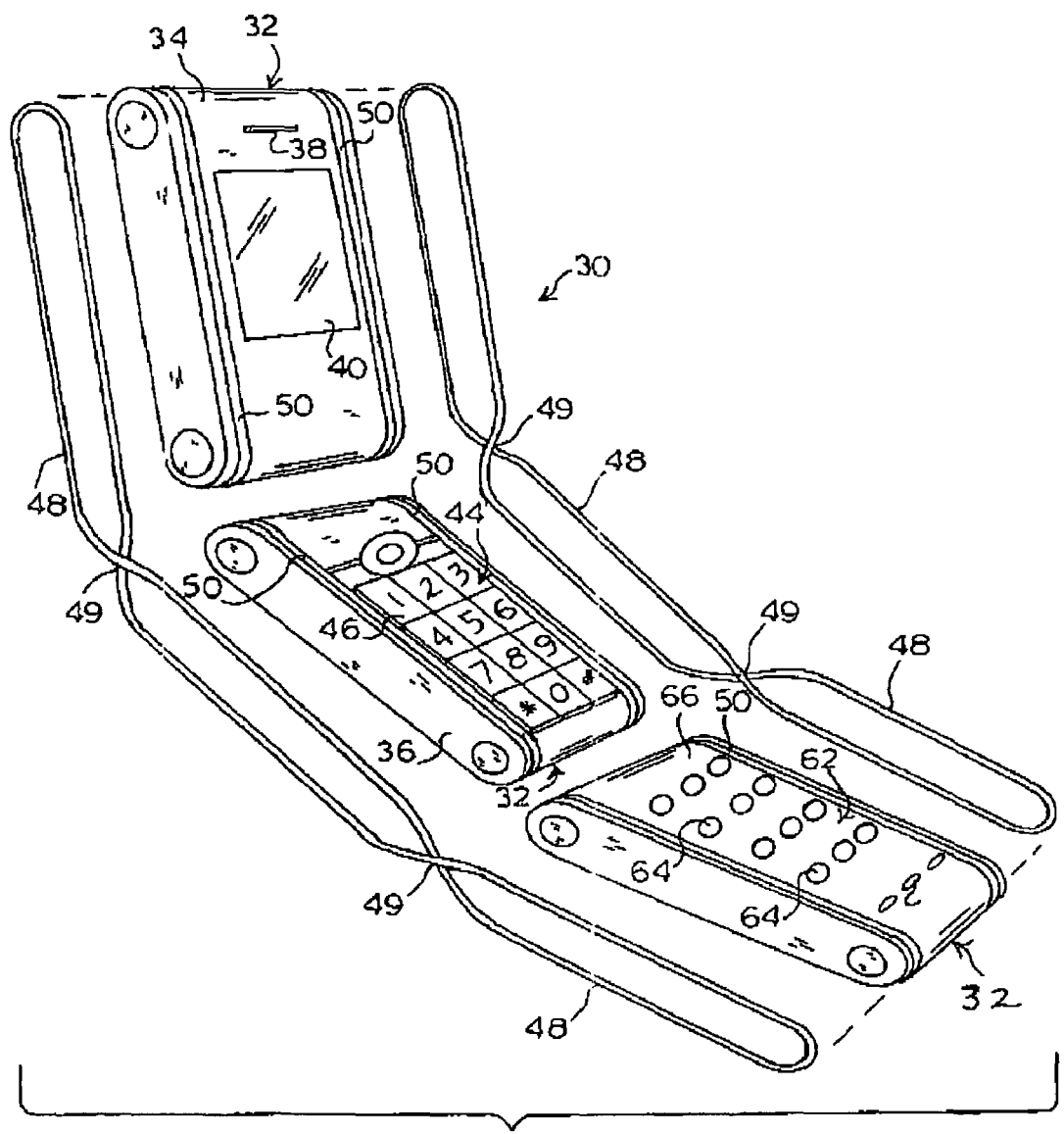

It is certified that error appears in the above-identified patent and that said Letters Patent is hereby corrected as shown below:

Insert on Column 3, after line 24 -- FIG. 9A is a perspective view of FIG. 9. --

Column 11, line 55, please delete "wit" and insert in place thereof -- with --

Column 12, line 38, please delete "end" and insert in place thereof -- and --

Signed and Sealed this

Twenty-second Day of September, 2009

David J. Kappos
*Director of the United States Patent and Trademark Office*